(12) United States Patent
Bradshaw

(10) Patent No.: US 7,001,075 B2
(45) Date of Patent: Feb. 21, 2006

(54) BEARING HUB

(75) Inventor: Ian M Bradshaw, Derby (GB)

(73) Assignee: Rolls-Royce plc, London (GB)

(*) Notice: Subject to any disclaimer, the term of this patent is extended or adjusted under 35 U.S.C. 154(b) by 0 days.

(21) Appl. No.: 10/609,654

(22) Filed: Jul. 1, 2003

(65) Prior Publication Data

US 2004/0017958 A1    Jan. 29, 2004

(30) Foreign Application Priority Data

Jul. 25, 2002  (GB) .................... 0217260

(51) Int. Cl.
*F16C 33/72* (2006.01)
(52) U.S. Cl. .................. 384/134; 384/478; 384/905
(58) Field of Classification Search ............ 384/478, 384/905, 134, 144

See application file for complete search history.

(56) References Cited

U.S. PATENT DOCUMENTS

| | | | |
|---|---|---|---|
| 3,572,855 A | * | 3/1971 | Weichsel .................... 384/132 |
| 4,856,915 A | | 8/1989 | Ryan |
| 5,131,763 A | | 7/1992 | Caron |
| 2002/0015545 A1 | | 2/2002 | Griseri |

FOREIGN PATENT DOCUMENTS

| | | |
|---|---|---|
| DE | 3 215 384 | 11/1983 |
| FR | 2 659 450 | 9/1991 |
| WO | PCT/SE95/00884 | 2/1996 |

* cited by examiner

*Primary Examiner*—Lenard A. Footland
(74) *Attorney, Agent, or Firm*—W. Warren Taltavull; Manelli Denison & Selter PLLC

(57) ABSTRACT

A bearing hub for a gas turbine engine comprises an inner annular member defining a bearing chamber and an outer annular member extending around the inner annular member. Each annular member defines an aperture to receive a conduit which can extend to the bearing chamber. The outer annular member is configured to slidingly engage the conduit at the aperture in the outer annular member.

17 Claims, 4 Drawing Sheets

BEARING HUB

FIELD OF THE INVENTION

This invention relates to bearing hubs. More particularly, but not exclusively, the invention relates to bearing hubs for use in gas turbine engines, for example the bearing hubs for the bearings supporting the high and intermediate pressure turbines.

BACKGROUND OF THE INVENTION

In gas turbine engines, the turbine discs for the high and intermediate pressure turbines are supported by bearings held within a common bearing hub. An example of such a bearing hub is an inner annular wall enclosing the bearing, and an outer annular wall surrounding the inner wall. The region between the inner and outer walls accommodates buffer sealing air to prevent leakage of oil out of the bearing chamber. It is important that the inner and outer walls are fixedly held together to provide sufficient rigidity for the respective turbines.

The outer wall is subjected to high temperatures, and this can cause considerable expansion. The inner wall is, on the other hand, subjected to much lower temperatures, and expands to a lesser degree. This differential thermal expansion of the inner and outer walls creates stress and can result in failure of the bearing hub.

SUMMARY OF THE INVENTION

According to one aspect of the invention there is provided a bearing hub for a gas turbine engine comprising an outer annular member surrounding a bearing chamber, the outer annular member defining an aperture to receive a conduit which can extend to the bearing chamber, wherein the outer annular member is configured to slidingly engage the conduit at the aperture therein.

According to another aspect of this invention, there is provided a bearing hub for a gas turbine engine comprising an inner annular member defining a bearing chamber, an outer annular member extending around the inner annular member, each annular member defining an aperture for a conduit, which can extend to the bearing chamber, the aperture in the inner annular member allowing communication between the conduit and the bearing chamber, wherein the outer annular member is configured to slidingly engage the conduit at the aperture therein. Thus, the preferred embodiment has the advantage that the sliding engagement of the outer annular member with the conduit at the aperture allows relative thermal expansion between the inner and outer annular members.

Preferably, the outer annular member includes sealing means at said aperture, whereby the sealing means can engage the conduit to provide sealing between the outer annular member and the conduit. The sealing means is preferably a sealing ring, a brush seal, or a labyrinth seal. Holding means may be provided to hold the sealing means in engagement with the conduit. In one embodiment, the holding means comprises securing means to secure the sealing means to the outer annular member. The part of the outer annular member surrounding the aperture may include a shoulder defining a circumferentially extending recess to receive the sealing means. The securing means may be mounted on the outer annular member to hold the sealing means in the recess. The securing means may be in the form of an annular retaining element extending around the aperture. The retaining element may be fastened to the outer annular member by fastening means. The fastening means may comprise a plurality of bolts, which may be receivable in threaded bores in the outer annular member, or threaded nuts may be provided to threadably engage the bolts.

Alternatively, the holding means comprise a holding member which may be annular and which may extend around the aperture. The holding member preferably defines a recess to receive the sealing means. The holding member may have a C shaped profile to define said recess.

Preferably, the inner and outer annular members are connected to each other by connecting means constructed to allow differential thermal expansion of the outer annular member relative to the inner annular member, in use. Preferably, the connecting means may comprise a connecting portion provided at least at one end region, and preferably at both the downstream and upstream end regions of the bearing hub. The, or each, connecting portion is preferably integral with the inner and outer annular members.

In one embodiment, the or each connecting portion may be integral with the inner and outer annular members.

BRIEF DESCRIPTION OF THE DRAWINGS

An embodiment of the invention will now be described by way of example only, with reference to the accompanying drawings, in which.

DETAILED DESCRIPTION OF THE INVENTION

Figure 1:
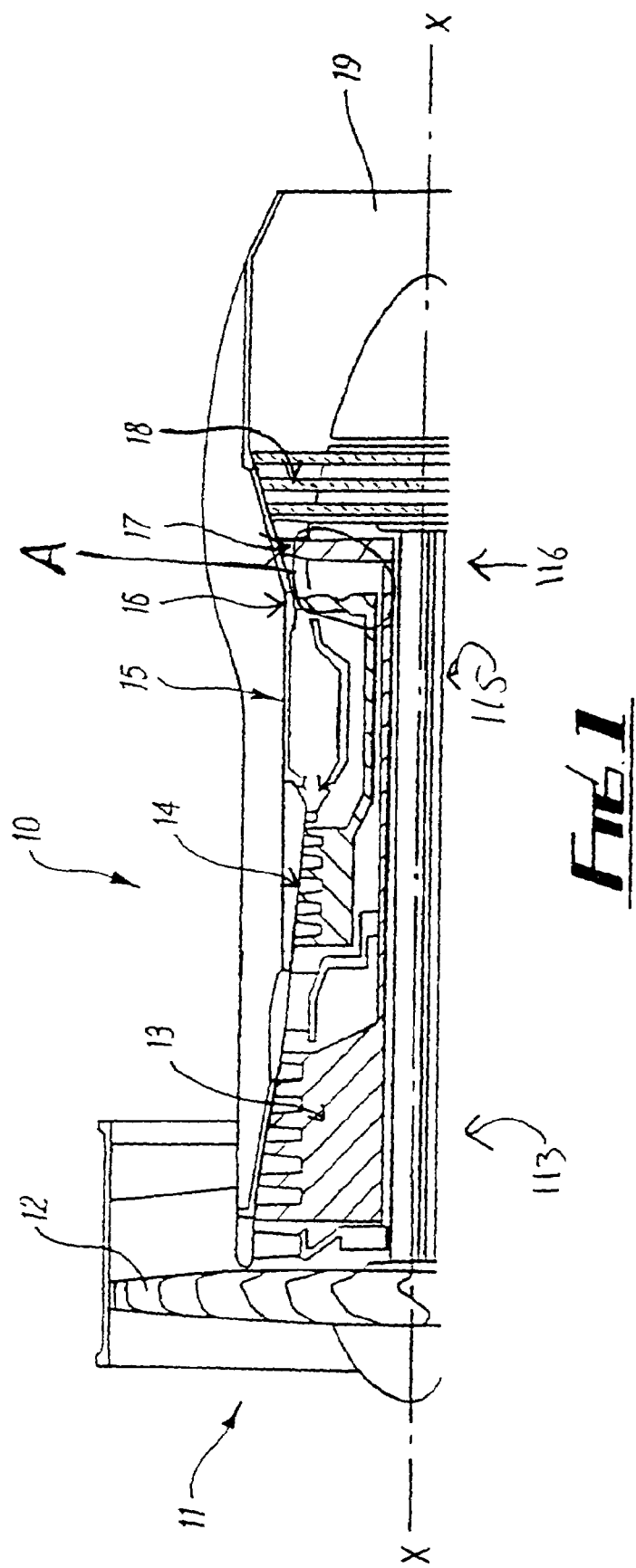
FIG. 1 is a sectional side view of the upper half of a gas turbine engine.

With reference to FIG. 1, a ducted fan gas turbine engine generally indicated at 10 has a principal axis X—X. The engine 10 comprises, in axial flow series, an air intake 11, a propulsive fan 12, a compressor region 113 comprising an intermediate pressure compressor 13, and a high pressure compressor 14, combustion means 115 comprising a combustor 15, and a turbine region 116 comprising a high pressure turbine 16, an intermediate pressure turbine 17, and a low pressure turbine 18. An exhaust nozzle 19 is provided at the tail of the engine 10.

The gas turbine engine 10 works in the conventional manner so that air entering the intake 11 is accelerated by the fan to produce two air flows: a first air flow into the intermediate pressure compressor 13 and a second air flow which provides propulsive thrust. The intermediate pressure compressor 13 compresses the air flow directed into it before delivering the air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive the high, intermediate and low pressure turbine 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

Figure 2:
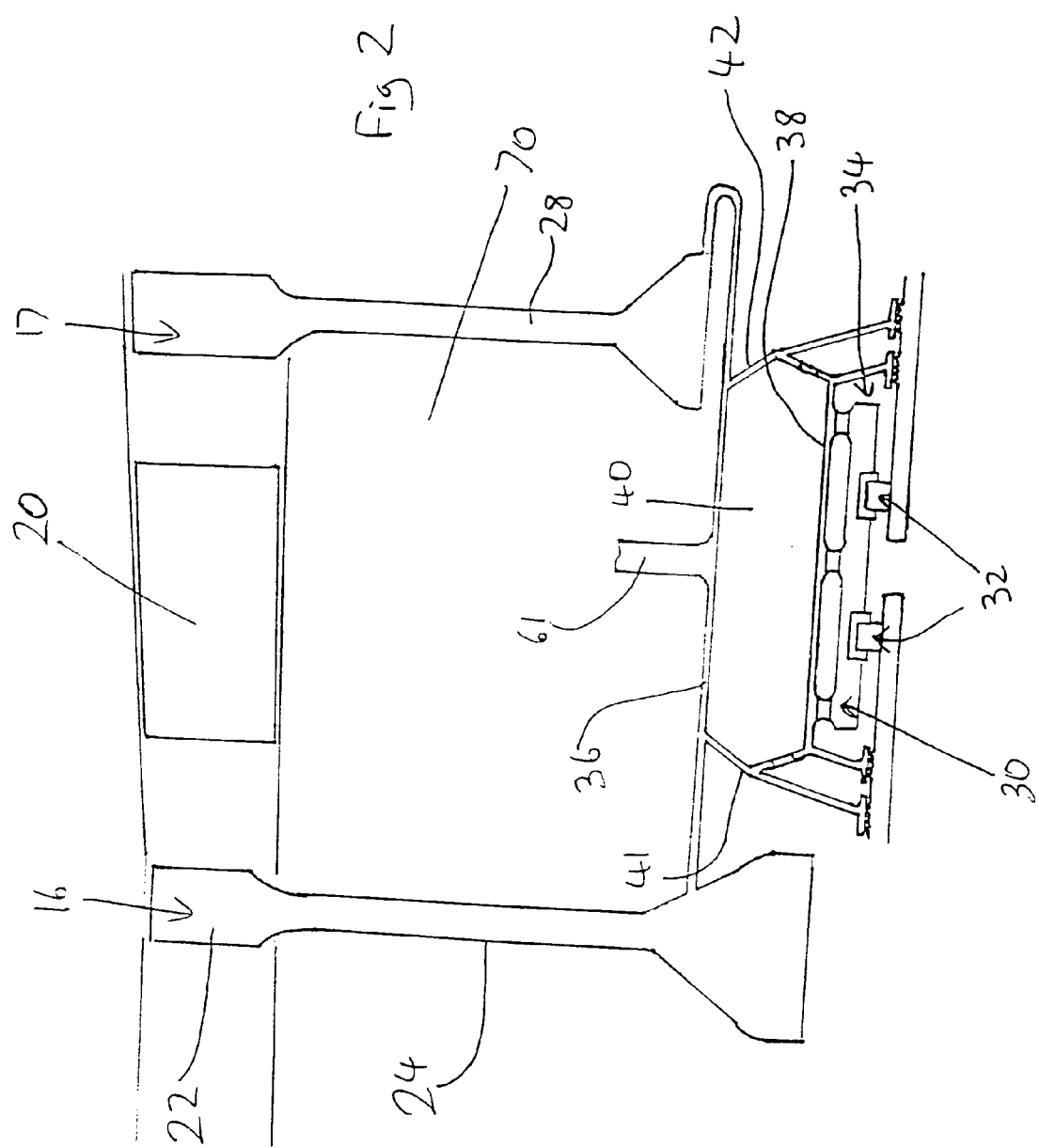
FIG. 2 is a sectional side view of the region marked A in FIG. 1.

FIG. 2, is a close-up of the region marked A in FIG. 1. In FIG. 2, there is shown the high pressure turbine 16, and the intermediate pressure turbine 17. A stator vane 20 is arranged between the blades of the high pressure and intermediate pressure turbines 16, 17.

The high pressure turbine 16 comprises a plurality of turbine blades 22 mounted on a disc 24. Similarly, the intermediate pressure turbine 17 comprises a plurality of turbine blades 26 mounted on a support disc 28. The high pressure turbine support disc 24 and the intermediate pressure turbine support disc 28 are connected to a bearing hub 30. The bearing hub 30 comprises an outer annular member 36 and an inner annular member 38. An annular space 40 is provided between the outer and inner annular members 36, 38. The inner annular member 38 defines a bearing chamber 34.

A plurality of bearings 32 are rotatably mounted in the bearing chamber 34 to provide support for the high and intermediate pressure turbine discs 24 and 28.

The outer and inner annular members 36, 38 are connected to each other at their upstream and downstream edges by an annular connecting portions 41, 42 respectively. The connecting portions 41, 42 are sufficiently flexible to accommodate differential thermal expansion of the inner and outer annular members 36, 38, as explained below.

Figure 3:
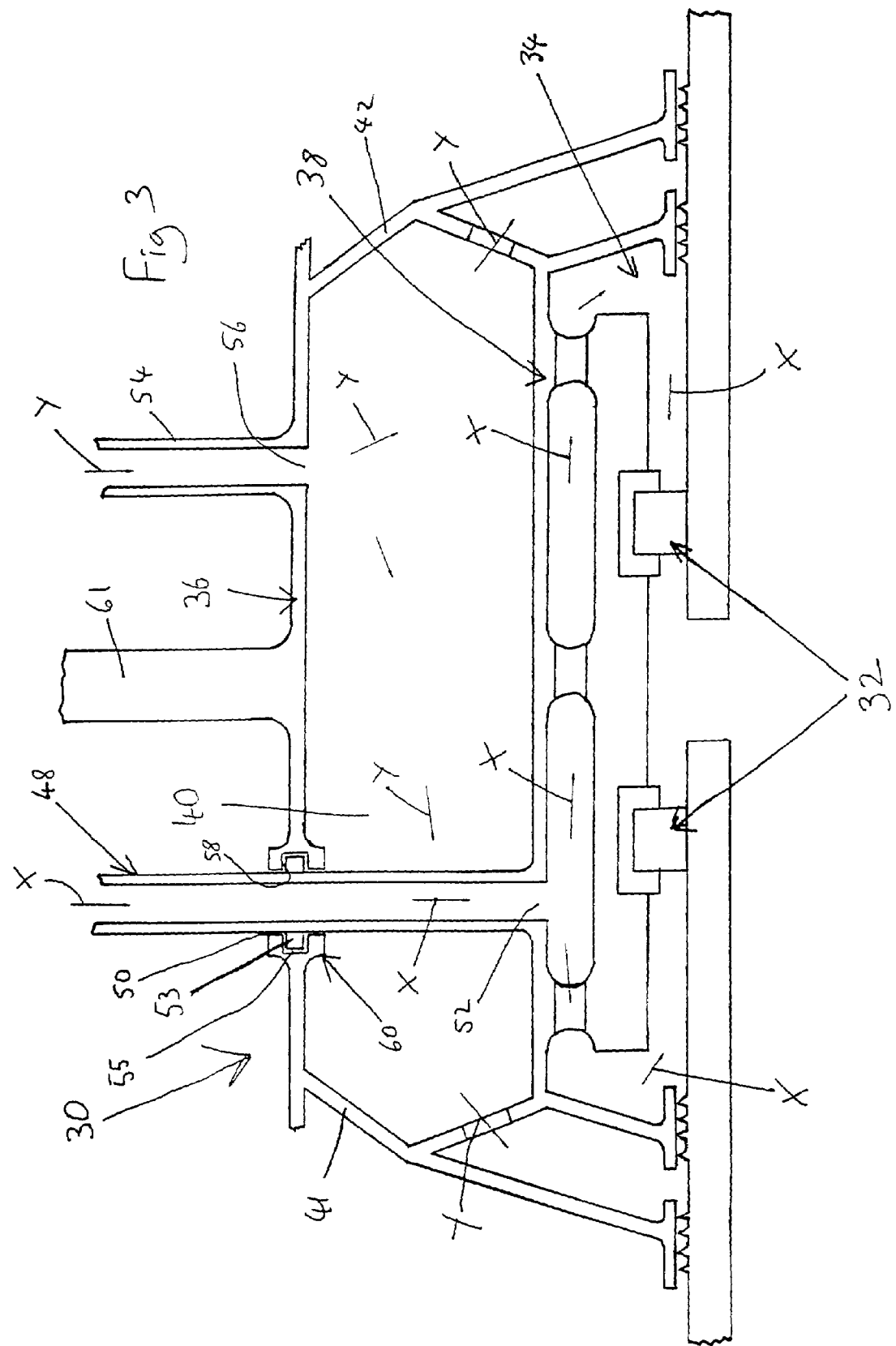
FIG. 3 shows an enlarged view of the bearing chamber shown in FIG. 2 from the first position.

Referring to FIG. 3, there is shown in more detail, the bearing hub 30. The view of the bearing hub 30 shown in FIG. 3 is from a different circumferential position to that shown in FIG. 2. In FIG. 3 a bearing hub service pipe 48 is shown. The outer annular member 36 defines an outer aperture 50 and the inner annular member 38 defines an inner aperture 52. The pipe 48 extends through the outer aperture 50 and is attached to the inner annular member 38 in the region surrounding the inner aperture 52, such attachment can be by for example welding the pipe 48 to the inner annular member 38, for example by butt welding. Thus, the pipe 48 is in communication with the bearing chamber 30 to supply oil thereto as indicated by the arrows X in FIG. 3, or remove oil therefrom.

The pipe 48 shown is a sliding fit within the aperture 52. The pipe 48 is held within the aperture 52 by sealing means in the form of a sealing ring 53 which extends around the pipe 50 at the aperture 52. The bearing hub 30 may include a plurality of pipes 48 at circumferentially spaced regions around the hub 34.

In addition to the service pipe or pipes 48, there is also provided an air delivery pipe 54 to deliver sealing air to the annular space 40 via an aperture 56 in the inner annular member 36, as indicated by the arrows Y. The air delivery pipe 54 is fixedly attached, for example by welding, to the outer annular member 36 at the aperture 56.

The sealing ring 53 is held in sealing engagement with the pipe 48 in an annular recess 58 defined by a holding member 60 provided on the outer annular member 36 surrounding the aperture 52. The holding member 60 has a generally C shaped profile, as shown.

A structural member 61 extends radially outwardly from the outer annular member 36 for connection to another feature (not shown) of the engine. The function of the structural member 61 is not material to the operation of the invention and is not described.

Figure 4:
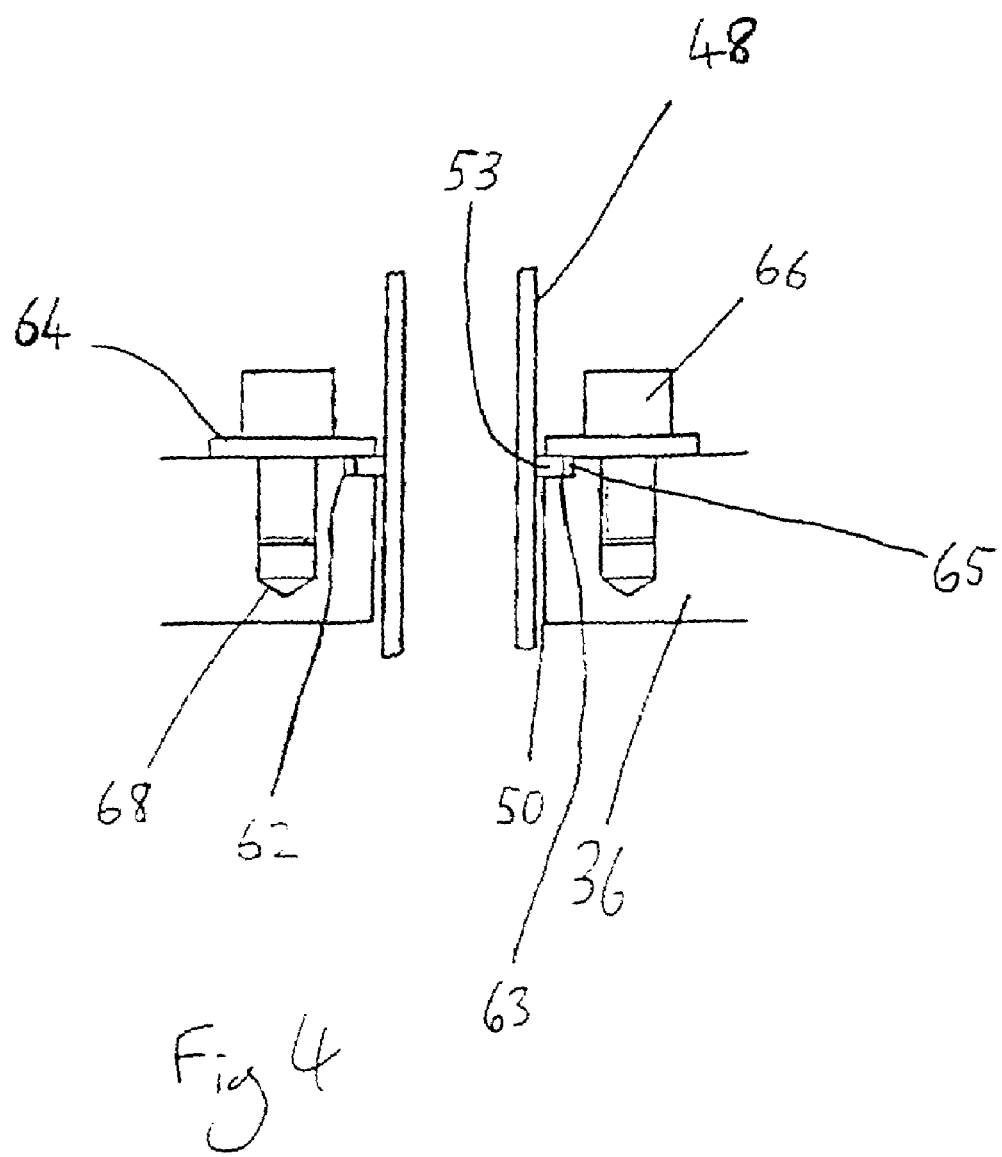
FIG. 4 shows an enlarged view of an alternative holding means for holding a sealing means.

Referring to FIG. 4, there is shown a close up of another embodiment for holding the sealing ring 53 in engagement with the service pipe 48. As can be seen, an annular recess 62 is defined around the aperture 50 at a shoulder 63 in the radially outer surface of the outer annular member 36, to receive the sealing ring 56. An annular retaining member in the form of an annular plate 64 is secured to the outer annular member 36 around the aperture 50 by a plurality of bolts 66 which are received in circumferentially spaced threaded bores 68 in the outer annular member 36. The retaining member 64 extends over the recess 62 and engages the annular sealing ring 53 to hold the sealing ring 53 in the recess 62.

The above described embodiments will now be described in operation. Referring again to FIG. 2, when the gas turbine engine 10 is in operation, air from the compressors is fed in a known manner to a region 70 between the high pressure and intermediate pressure turbine discs 24, 28. The air supplied to the region 70 is bled from the high pressure compressor 14. Similarly, sealing air is bled from the intermediate compressor 13 via the air delivery pipe 54 to the space 40 between the inner and outer annular members 36, 38.

The temperature of the air in the region 70, is greater than the temperature of the sealing air in the space 40, which in turn is greater than the temperature of the oil in the bearing chamber 34. As a result of these temperature differences, the structural member 61 is subjected to large thermal expansion resulting from the high temperature air from the high pressure compressor in the region 70. This contributes to causing considerable stresses on the outer annular member 36. The inner annular member 38 is, on the other hand heated to a much lesser degree because of the cooler oil temperature in the bearing chamber 34. Thus, the inner annular member 38 expands to a much lesser degree and the stresses thereon are also significantly less.

The provision of the sealing ring 53, enables the outer annular member 36, to reduce the stresses therein by the sliding of the sealing ring 53 over the pipe 48. In addition, the sealing ring 53 can accommodate circumferential movement of the pipe 48 relative to the sealing ring 53. This accommodation is effected by a clearance 55 around the sealing ring 53 in the recess 58 in the embodiment shown in FIG. 3, and by a clearance 65 around the sealing ring 53 in the recess 62. This has the advantage in the embodiments shown of allowing the accommodation of movement arising from thermal expansion and from tolerance build-up without compromising the sealing function. This provides an advantage of the elimination of high stresses during such expansion.

In addition, the connection of the outer annular member 36 to the inner annular member 38 by the upstream and downstream annular connecting portions 41, 42 provides sufficient flexibility to allow the outer annular member 36 to expand with the sealing ring 53 sliding along the pipe 48 without the creation of stresses within the hub 30.

There is thus described a simple but effective arrangement for accommodating the expansion of the outer annular member of a bearing hub preventing stresses in the hub 30 thereby providing for a longer life of the hub.

Various modifications can be made without departing from the scope of the invention. For example, the flexibility of the outer annular member 36 relative to the inner annular member 38 can be effected by means other than the connecting portions 41, 42. Also, the attachment of the pipe 50 to the inner annular member can be by any conventional means such as a friction fit, welding, brazing, or being formed as an integral part (e.g. by casting). The sealing ring 53 may be a brush seal or a labyrinth seal.

It will be appreciated that an advantageous feature of the upstream and downstream connecting portions 41, 42 is that they are sufficiently flexible to accommodate the aforesaid differential thermal expansion of the inner and outer annular members 36, 38. Thus, the connecting portions 41, 42 need not be integral with the inner and outer annular members. Instead, the connecting portions could be in the form of separate plates connected to the inner and outer annular members 36, 38 by suitable fastening means, such as bolts or the like.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A turbine arrangement comprising a turbine rotatably mounted on a bearing hub, wherein the bearing hub comprises an outer annular member surrounding a bearing chamber, the outer annular member defining an aperture to receive a conduit which can extend to the bearing chamber, wherein the outer annular member is configured to slidingly engage the conduit at the aperture.

2. A turbine arrangement according to claim 1 having first and second turbines rotatably mounted on the bearing hub.

3. A turbine arrangement according to claim 2 wherein the first turbine is a high pressure turbine and the second turbine is an intermediate pressure turbine.

4. A gas turbine engine incorporating a turbine arrangement according to claim 1.

5. A bearing hub for a gas turbine engine comprising an outer annular member surrounding a bearing chamber, the outer annular member defining an aperture to receive a conduit which can extend to the bearing chamber, wherein the outer annular member is configured to slidingly engage the conduit at the aperture and wherein the outer annular member includes sealing means at said aperture, whereby the sealing means can engage the conduit to provide sealing between the outer annular member and the conduit and further comprising holding means on the outer annular member, surrounding the aperture, to hold the sealing means.

6. A bearing hub according to claim 5 wherein the holding means defines a recess to receive the sealing means.

7. A bearing hub according to claim 6 wherein the recess is defined adjacent the aperture at a shoulder on the outer annular member.

8. A bearing hub according to claim 7 wherein the holding means further includes a retaining member to retain the sealing means in the recess.

9. A bearing hub according to claim 8 wherein the retaining member comprises an annular plate and fastening means to fasten the plate to the outer annular member.

10. A bearing hub for a gas turbine engine comprising an outer annular member surrounding a bearing chamber, the outer annular member defining an aperture to receive a conduit which can extend to the bearing chamber, wherein the outer annular member is configured to slidingly engage the conduit at the aperture and wherein the outer annular member includes sealing means at said aperture, whereby the sealing means can engage the conduit to provide sealing between the outer annular member and the conduit and wherein the sealing means comprises a sealing ring.

11. A bearing hub for a gas turbine engine comprising an outer annular member surrounding a bearing chamber, the outer annular member defining an aperture to receive a conduit which can extend to the bearing chamber, wherein the outer annular member is configured to slidingly engage the conduit at the aperture and further comprising an inner annular member defining the bearing chamber, the outer annular member extending around the inner annular member, wherein the inner annular member defines a further aperture to allow communication between the conduit and the bearing chamber.

12. A bearing hub according to claim 11 wherein the outer annular member includes sealing means at said aperture, whereby the sealing means can engage the conduit to provide sealing between the outer annular member and the conduit.

13. A bearing hub according to claim 11 wherein the outer and inner annular members are connected to each other by connection means constructed to allow differential thermal expansion of the outer annular member relative to the inner annular member, in use.

14. A bearing hub according to claim 13 wherein the connection means comprises a connecting portion provided at at least one and region of the bearing hub.

15. A bearing hub according to claim 14 wherein the, or each, connecting portion is annular and is separate from but attachable to the inner and outer annular members.

16. A bearing hub according to claim 14 wherein a connecting portion is provided and each of the upstream end and downstream ends of the outer and inner annular members.

17. A bearing hub according to claim 14 wherein the, or each, connecting portion is sufficiently flexible to allow said relative thermal expansion of the outer annular member.

* * * * *